US011360262B2

(12) United States Patent
Baets et al.

(10) Patent No.: US 11,360,262 B2
(45) Date of Patent: Jun. 14, 2022

(54) TEMPERATURE INSENSITIVE FILTER

(71) Applicants: UNIVERSITEIT GENT, Ghent (BE); IMEC VZW, Leuven (BE)

(72) Inventors: Roeland Baets, Deinze (BE); Eva Ryckeboer, Ghent (BE); Abdul Rahim, Bahawalpur (PK); Anton Vasiliev, Bredene (BE); Xiaomin Nie, Ghent (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 16/958,476

(22) PCT Filed: Dec. 31, 2018

(86) PCT No.: PCT/EP2018/086899
§ 371 (c)(1),
(2) Date: Jun. 26, 2020

(87) PCT Pub. No.: WO2019/129798
PCT Pub. Date: Jul. 4, 2019

(65) Prior Publication Data
US 2021/0063638 A1   Mar. 4, 2021

(30) Foreign Application Priority Data

Dec. 29, 2017 (EP) .................................... 17211059

(51) Int. Cl.
*G01J 3/18* (2006.01)
*G01J 3/22* (2006.01)
(Continued)

(52) U.S. Cl.
CPC ......... *G02B 6/12007* (2013.01); *G02B 6/124* (2013.01); *G02B 6/29328* (2013.01);
(Continued)

(58) Field of Classification Search
CPC .... G01J 3/1895; G01J 3/22; G01J 3/36; G01J 2003/1204; G02B 6/12007; G02B 6/124;
(Continued)

(56) References Cited

U.S. PATENT DOCUMENTS 6,269,203 B1   7/2001   Davies et al.
6,504,180 B1 *   1/2003   Heremans ............ G02B 6/4249
257/88

(Continued)

FOREIGN PATENT DOCUMENTS

CN   106796326 A   5/2017
JP   S61223711 A   10/1986
WO   0186848 A1   11/2001

OTHER PUBLICATIONS

Yusop et al., "Determination of Thermo-Optic Coefficient of a UV Curable Polymer using Prism Coupling Technique," International Conference on Software Engineering 2004, Jan. 1, 2004, pp. 482-485.
(Continued)

*Primary Examiner* — Ryan A Lepisto
(74) *Attorney, Agent, or Firm* — Workman Nydegger

(57) ABSTRACT

An integrated wavelength-selective filter device comprises a first optical element, for directing received radiation into a direction defined by a first angle, and a second optical element being a diffractive element configured for diffracting the directed radiation under a second angle. The second angle is such that for a single reference wavelength the diffracted radiation is directed into a propagation medium for advancing therein towards a predetermined position on the first optical element or on a further optical element for filtering radiation having a wavelength substantially matching the reference wavelength from radiation having a substantially different wavelength. The propagation medium is formed from a material that is different from any material of the substrate of the first and the second optical element.

20 Claims, 4 Drawing Sheets

(51) Int. Cl.
*G02B 6/12* (2006.01)
*G02B 6/124* (2006.01)
*G02B 6/293* (2006.01)
*G01J 3/36* (2006.01)
*G01J 3/12* (2006.01)

(52) U.S. Cl.
CPC ........ *G02B 6/29398* (2013.01); *G01J 3/1895* (2013.01); *G01J 3/22* (2013.01); *G01J 3/36* (2013.01); *G01J 2003/1204* (2013.01); *G02B 6/29326* (2013.01)

(58) Field of Classification Search
CPC ............ G02B 6/29326; G02B 6/29328; G02B 6/29398
See application file for complete search history.

(56) References Cited

U.S. PATENT DOCUMENTS

| | | | | |
|---|---|---|---|---|
| 7,450,623 | B2* | 11/2008 | O'Daniel | H01S 5/1082 372/50.11 |
| 9,835,591 | B2* | 12/2017 | Dell | G01N 21/7746 |
| 2003/0002789 | A1 | 1/2003 | Boye et al. | |
| 2005/0213886 | A1 | 9/2005 | Balakrishnan et al. | |
| 2009/0154876 | A1 | 6/2009 | McLaughlin et al. | |
| 2011/0116801 | A1* | 5/2011 | Morris | G02B 17/02 398/87 |
| 2012/0218559 | A1* | 8/2012 | Dell | G01N 29/036 356/480 |
| 2017/0261694 | A1 | 9/2017 | Xu et al. | |
| 2018/0188152 | A1* | 7/2018 | Vercruysse | G01N 15/1436 |

OTHER PUBLICATIONS

Arbabi et al., "Measurements of the Refractive Indices and Thermo-Optic Coefficients of Si3N4 and SiOx using Microring Resonances," Optics Letters, vol. 38, No. 19, Oct. 1, 2013, pp. 3878-3881.

Extended European Search Report from corresponding EP Application No. EP17211059.5, dated Jul. 12, 2018.

International Search Report and Written Opinion from PCT Application No. PCT/EP2018/086899, dated Mar. 19, 2019.

Office Action from corresponding Chinese Application No. 201880084427.0, dated Feb. 15, 2022.

* cited by examiner

TEMPERATURE INSENSITIVE FILTER

FIELD OF THE INVENTION

The present invention generally relates to wavelength selective optical filters and optical systems including these filters, and more particularly, to integrated, athermal wavelength selective optical filters and integrated optical systems including these filters.

BACKGROUND OF THE INVENTION

Optical wavelength filters in integrated photonic platforms tend to drift with temperature and this results in incorrect wavelength readings. This is caused by two effects: the change of refractive index of the material due to the thermo-optic (TO) effect and thermal expansion of devices. Often the thermo-optic effect dominates, but for accurate measurements also the thermal expansion cannot be neglected. For spectroscopic applications or other applications where an absolute determination of optical wavelength is desired, active temperature tracking or the use of a fixed reference wavelength is required.

In the past, a plurality of attempts have been made to provide a solution for taking into account the thermo-optic effect and/or thermal expansion. In one solution, athermal optical waveguides are used. The optical waveguides used on the chip are covered with a material that has a thermo-optic coefficient having an opposite sign compared to the thermo-optic coefficient of the waveguide, such that the effect is counteracted. However, these approaches typically suffer from chemical instability, higher waveguide losses and CMOS incompatibility.

In another solution, thermally self-compensating optical filters were used. A Mach-Zehnder interferometer thereby was designed to be robust against temperature fluctuations by using different polarization states or waveguide widths in the two arms. However, this approach still suffers from a drift due to thermal expansion. This approach is also sensitive to fabrication imperfections.

In yet another solution, active thermal compensation is used. The temperature of the Photonic Integrated Circuit can be controlled and kept stable with a Peltier element that allows for cooling and heating of the chip. The main disadvantages of this approach are the large power dissipation and the complex control systems that are required. Also, it is very difficult to reach sufficient stability for spectroscopic applications.

Also the use of an external reference optical filter (e.g. gas cell) was explored. The gas cells nevertheless are expensive and the need for an external filter cancels the advantages of photonic integration.

Consequently, there is still room for improvement.

SUMMARY OF THE INVENTION

It is an object of embodiments of the present invention to provide good athermal wavelength-selective optical filters and integrated optical systems including these filters.

It is an advantage of embodiments of the present invention that a wavelength filter is provided that is substantially temperature insensitive and which is purely passive and does not require active control. It is an advantage of embodiments of the present invention that at least the thermo-optic effect inducing changes in refractive index is compensated for.

It is an advantage of embodiments of the present invention that radiation that is not substantially matching the reference wavelength, will not be coupled back to the first optical element or further optical element and consequently, will not pass the wavelength-selective filter.

It is an advantage of embodiments of the present invention that a wavelength filter is provided that is substantially temperature insensitive and that acts as a passband filter of which the output can be used as a reference wavelength.

It is an advantage of embodiments that a filter is provided of which the design is tolerant for fabrication imperfections.

It is an advantage of embodiments of the present invention that active tracking of the temperature is not required.

It is an advantage of embodiments of the present invention that they are provided as an integrated solution, e.g. integrated on a photonic integrated circuit, thus avoiding the need for external components.

The above objective is accomplished by a method and device according to the present invention.

The present invention relates to an integrated wavelength-selective filter device comprising:
a first optical element patterned in or on a substrate and configured for receiving radiation incident thereon and for directing at least partially said received radiation into a direction defined by a first angle,
a second optical element patterned in or on a substrate and being a diffractive element and extending longitudinally and arranged distantly to the first optical element, the second optical element being configured for receiving said directed radiation under an angle of incidence and adapted for diffracting said directed radiation under a second angle, said second angle depending on wavelength.

The first optical element is directing the received radiation into a propagation medium, through which the directed received radiation is propagating until it is received at the second optical element. The propagation medium is formed from a material that is different from any material of the substrate of the first and the second optical element.

The second optical element is configured such that the second angle is such that for a single reference wavelength the diffracted radiation is directed into the propagation medium for advancing therein towards a predetermined position on the first optical element or on a further optical element, for filtering radiation having a wavelength substantially matching the reference wavelength from radiation having a substantially different wavelength, whereby the reference wavelength is uniquely determined for the entire device.

The different material of the propagation medium may be such that its thermo-optic refractive index coefficient is substantially smaller, e.g. at least one order of magnitude smaller or at least two orders of magnitude smaller, than the respective refractive index of any material of the substrate of the first and second optical element. Alternatively or additionally, the different material of the propagation medium may be such that its refractive index is substantially smaller, e.g. at least 10% or at least 20% or at least 50% smaller, than the respective refractive index of any material of the substrate of the first and second optical element.

The first angle may be the central angle for central ray of a ray bundle of directed received radiation, e.g. the central angle of a diverging beam. A diverging beam has an associated angular spread, hence the second angle (diffraction angle) may be different for different angular spectral components of the directed radiation incident on the second optical element.

The first optical element and/or the second optical element may be gratings or grating couplers. The first angle may then depend on wavelength.

A waveguide may be used for providing radiation to the first optical element. The waveguide may be a single mode waveguide or may be a multimode waveguide.

The first optical element, and if present the further optical element, thus may be connected to a waveguide for transporting the optical input and output signals into and out of the filter device.

The first optical element may be a corrugated grating coupler. It is an advantage of embodiments of the present invention that corrugated gratings may have large angular dispersion which reduces the deflection path length/height, allowing to obtain a compact filter design.

The second optical element may be a corrugated grating. The grating may be a blazed grating. It is an advantage of embodiments of the present invention that grooves of the gratings may be well-defined, hence may result in less ghost images. It is an advantage of embodiments of the present invention that cointegration with the first optical element, e.g. the first grating coupler, minimizes errors in positioning of the optical elements with respect to each other. The corrugated grating may be a chirped grating satisfying the Littrow condition for the reference wavelength.

It is an advantage of embodiments of the present invention that the chirp of gratings can be well-controlled phase gratings based on index modulation. It is an advantage of embodiment that easy processing can be obtained, compared to e.g. doped gratings which involve more processing steps and are more expensive. It is an advantage of Littrow gratings that the Littrow condition ensures independence of the diffraction angle on grating material index and therefore also on its temperature changes.

The first optical element, the second optical element and if present the third optical element may be patterned or integrated in or on a same substrate.

In some embodiments, the second optical element may be adapted for back-reflecting said directed radiation into said propagation medium for advancing therein along the same elevation angular direction with respect to a flat surface of the substrate on or into which the second optical element is patterned, but with opposite propagation sense as compared to the radiation incident on the second optical element When a waveguide is used for providing radiation towards the first optical element, the radiation, after interaction with the second optical element, may be coupled out by the first optical element through the same waveguide. The filtering thus can be obtained by the radiation, after interaction with the second optical element, being incident again on the first optical element under the first angle. The radiation may thus be reflected back to the same waveguide as used for coupling in the radiation in the wavelength-selective filter. An optical component for splitting the output from the input, such as for example a circulator or a 3 dB coupler may be used.

In some embodiments, the second optical element may be configured in an off-axis configuration so as to diffract backwards the radiation incident on the second optical element along a different azimuthal direction as compared to the azimuthal direction of the incident radiation incident on the second optical element. An azimuthal angular direction may be defined with respect to a flat surface of the substrate on or into which the second optical element is patterned. The filter device then is further comprising a further optical element having similar characteristics as the first optical element and being configured for coupling out the filtered radiation.

The filtering can thus also be obtained by the radiation being incident on a different optical element, after interaction with the second optical element, wherein the second optical element is operated in a slight off-axis configuration. The selected radiation then is coupled out via a different waveguide, different from the input waveguide.

The filter device may comprise at least one material with a thermal expansion coefficient or design, such that, for a change in at least the second angle (diffraction angle) caused by a change in the temperature of the device, the length of a path of said directed radiation propagating in said propagation medium from the first optical element to the second optical element is adapted automatically by thermal expansion of the device due to the temperature change, such that for the reference wavelength, the diffracted radiation again is directed to the predetermined position. For gratings as first optical element, also a change in the first angle (deflection angle) may be accounted for. It is an advantage of embodiments of the present invention that adapting of the path length is an entirely passive process, solely induced by the temperature change. It is an advantage of embodiments of the present invention that not only the thermo-optic effect but also effects of thermal expansion are compensated for. It is an advantage of embodiments that this is obtained in a passive way.

The filter device may furthermore comprise a reflective element so that on the path of said directed radiation propagating from the first optical element to the second optical element, the radiation is reflected by a reflective surface of the reflective element. The device may be formed more compact by reducing the height. The reflective surface may be a reflective Fresnel lens. The diffraction cone of the light can thus be reduced by collimating or refocusing.

The first optical element and the second optical element may both be formed on a flat surface of the device, and wherein the reflective element is positioned above or below said flat surface.

The device furthermore may comprise at least one stand-off for supporting the reflective element being positioned above or below said flat surface. The stand-off may for example have a rectangular shape. It is an advantage of embodiments of the present invention that this solution allows for a parallel alignment of the mirror surface/reflective element surface with respect to the surface of the optical element(s) and reduces errors in the second angle of incidence due to fabrication tolerances; good height control is possible by uniform growth control.

Adapting of a path length may be obtained by the overall thermal expansion of the stand-offs. Compensation of the thermal expansion effects may be obtained by a proper material choice and a proper selection of dimensions of the stand-offs.

The stand-off material may be selected such that its overall thermal expansion coefficient is approximately three times larger, e.g. between 2 and 4 times larger or e.g. between 2.5 and 3.5 times larger such as for example 3 times larger, than the thermal expansion coefficient of the substrate material in or on which both the first optical element and the second optical element are formed. This condition may be optimum for a first angle being between 40 deg and 50 deg, such as for example for a first angle being 45 deg. It is an advantage of embodiments of the present invention that an optimal temperature insensitivity is obtained. The stand-off or part thereof may be the substrate of the first or the second optical element. A stand-off which is at least partially formed from the substrate may advantageously simplify the alignment of the mirror surface/reflective element to the substrate on which both the first and second optical element are formed.

Temperature insensitivity may be less than 1 pm/K over a temperature range of 100 K in a silicon platform. This is approximately a reduction by a factor one hundred compared to conventional, uncompensated silicon wavelength filters.

The first optical element and the second optical element may be positioned above one another and the propagation path of the at least partially diffracted radiation through said propagation medium may be following a straight line. In different embodiments of the present invention, the propagation path of said at least partially diffracted radiation propagating from the first optical element to the second optical element through the propagation medium may be a path through gas or vacuum, e.g. a path through air. Advantageously, the path passes through a propagation medium with a substantially temperature independent refractive index, such as for example gas, such as air, or vacuum. It is an advantage of embodiments of the present invention that no absorption losses of light occurs along the path. It is also an advantage of embodiments of the present invention that no additional fabrication steps are required.

The first optical element and the second optical element may be formed in a semiconductor or dielectric substrate of a chip. It is an advantage of embodiments of the present invention that a compact system can be obtained. It is an advantage of embodiments of the present invention that production can be based on mass production and low-cost manufacturing techniques. It is an advantage of embodiments of the present invention that a densely integrated device can be obtained.

The first optical element and the second optical element may be manufactured in a semiconductor-on-insulator platform, e.g. a silicon-on-insulator platform. In some embodiments, the substrate may be a semiconductor substrate, in other embodiments the substrate may be a dielectric substrate.

The present invention also relates to an integrated system for providing a stable reference wavelength, the system comprising:
an integrated wavelength-selective filter device as described above,
an integrated broadband light source, and
at least one light guide coupled to the light source and to the first dispersive element of the wavelength-selective filter device for providing broadband light to the first optical element and for extracting radiation having the reference wavelength from the first optical element.

The light guide may also be used for extracting radiation having the reference wavelength from the first optical element. Alternatively extraction of radiation from the reference wavelength may be performed using a further optical element and a further light guide.

It is an advantage of embodiments of the present invention that a compact, mass producible, and low-cost, stable reference wavelength can be obtained for measurement systems requiring a stable reference, e.g. spectroscopy.

The system furthermore may comprise a plurality of integrated detector elements and wherein the integrated wavelength-selective filter is adapted for diffracting radiation of different wavelengths to different predetermined positions so as to direct radiation of different wavelengths to different integrated detector elements.

The present invention furthermore relates to an integrated spectrometer system, the system comprising a plurality of integrated wavelength-selective filter devices as described above, a plurality of light guiding circuits, and a plurality of integrated detectors, whereby each of the plurality of wavelength-selective filter devices is configured to have a different reference wavelength thereby defining a set of reference wavelengths, and whereby each of the plurality of light guiding circuits is adapted to receive a fraction of an externally applied radiation signal and to transmit it to one of the plurality of wavelength-selective filter devices for obtaining therefrom radiation of a specific reference wavelength and for directing the obtained radiation to one of the plurality of detectors. It is an advantage of embodiments of the present invention that a compact, mass producible and low cost stable spectrometer can be obtained.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
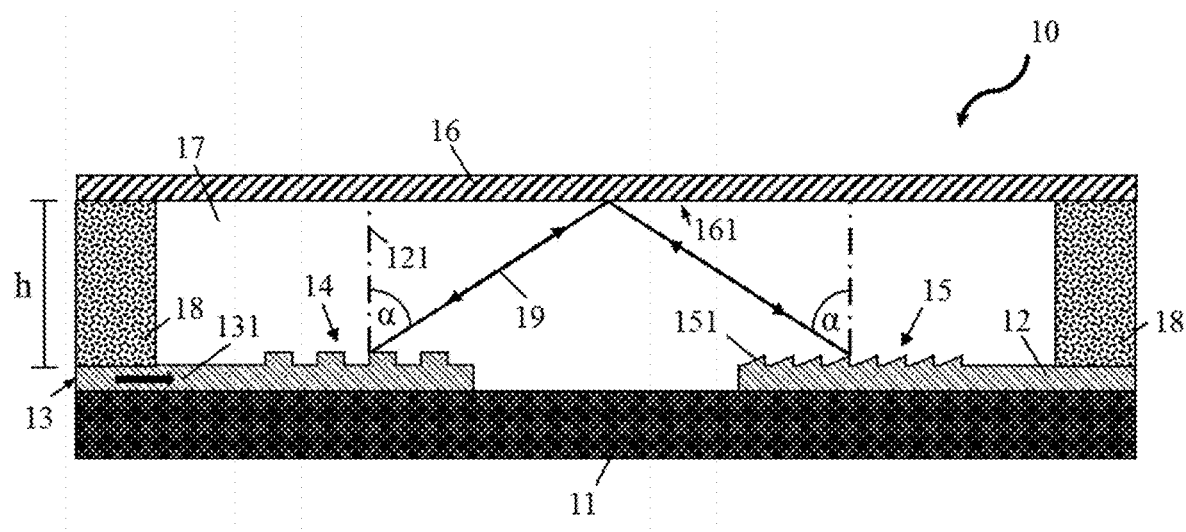
FIG. 1 is a schematic cross-sectional view of an integrated wavelength-selective filter device according to a first embodiment of the invention, comprising two integrated gratings as first and second optical elements arranged on a flat surface and one additional reflective surface positioned above the flat surface.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in the description reference is made to radiation, radiation in the form of light as part of the electromagnetic spectrum is meant. This includes in particular light in the UV, visible, near-, mid-, and far-infrared spectrum.

An athermal optical filter or filtering device is intended to designate optical filters comprising one or more technical means that significantly reduce its temperature sensitivity or compensate for temperature drifts in respect of the center wavelength of a passband, which would have a negative impact on the filter or filtering device performance if said one or more technical means were ab sent.

An "integrated" wavelength-selective filter device, in the context of the present invention, refers to a device that comprises at least a first and a second optical element, which are adapted for directing or re-directing received radiation into spatial directions that can be characterized by in term of angles, the angles being dependent on the specific wavelength of the received radiation. The first and a second optical element are each patterned on or into a substrate. The first and a second optical element may be grating structures or diffractive structures which are respectively patterned on or into a substrate. The "integrated" wavelength-selective filter device may comprise additional optical elements, radiation sources, detectors. An "integrated" wavelength-selective filter device is well-suited for further device integration onto a single chip, for instance a chip including control electronics or readout electronics cooperating with the wavelength-selective filter device to form a single compact, functional device.

A "substrate" refers to a material or a material combination that forms a physical supporting basis for the incorporation, inclusion, attachment, or deposition of additional materials on or within the substrate materials, and for the exclusion, removal or modification of already existing materials in the substrate. More than one substrate can be combined into new substrate, e.g. by bonding or stacking. In the embodiments of the invention, the substrate may be that of a photonic circuit die or planar lightwave circuit; the substrate may comprise silicon or silicon-on-insulator. The photonic circuit die may be obtained as a portion of a larger wafer which has been diced, cut, sliced or otherwise divided into smaller pieces. In some embodiments, with "substrate" also reference may be made to only part of the physical supporting basis—possibly as such not sufficiently strong for acting as a physical support without additional material layer(s), and it will be understood that in such cases typically also a further material providing a mechanical carrier will be present in the device, such as for example a thick silicon layer.

If in embodiments of the invention reference is made to "stand-off(s)", what is meant is one or more structural support elements being comprised by the integrated wavelength-selective filter device and having a wall-like, pillar-like or ball-like configuration. "Stand-offs" act as spacers ensuring structural support and a controlled distance spacing between combined or assembled elements that form part of the integrated wavelength-selective filter device, for instance between two flat surfaces of distinct but combined substrates which are facing each other. In embodiments of the inventions providing "stand-offs", their presence must not influence the propagation of radiation between the first and second optical elements. This means that the "stand-offs" as support structures are arranged in such a way that the directed or diffracted radiation within the operating filter device is not propagating through the "stand-off" material as propagation medium. This may be achieved by positioning the "stand-offs" in such a way that they enclose the first and second optical elements at their periphery. In one embodiment of the present invention the stand-off may in part or in its entirety make use of the substrate material itself, in which case the substrate material needs to be locally removed to avoid that the radiation is not propagating through it.

Figure 5:
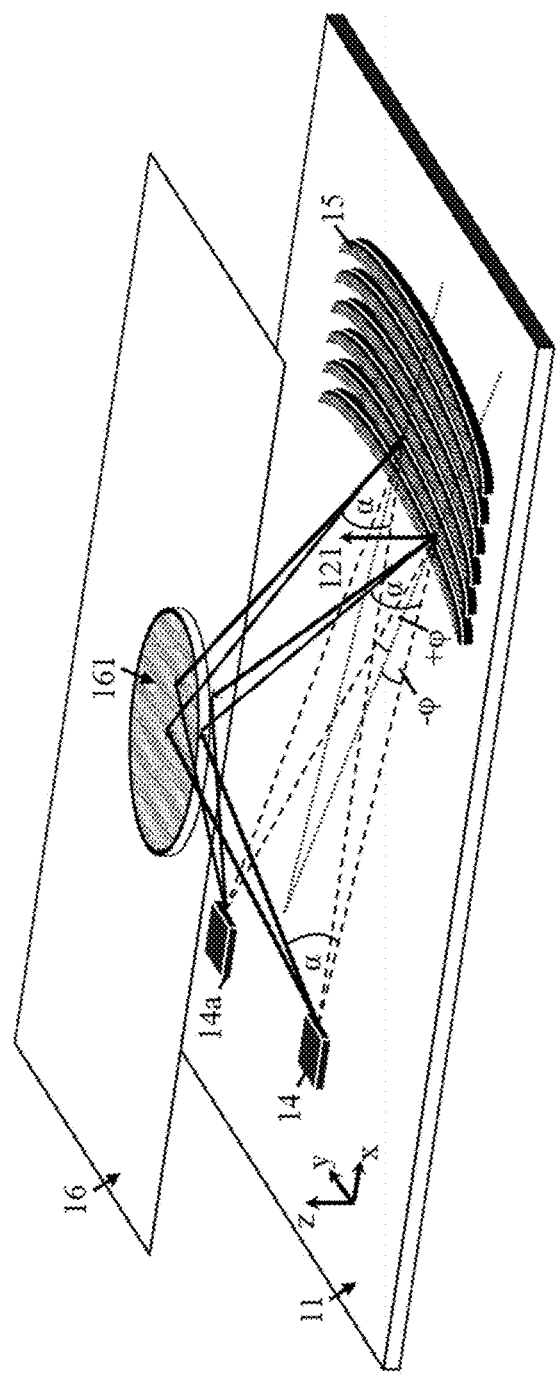
FIG. 5 is a schematic perspective view of an integrated wavelength-selective filter device being positioned off-axis, according to an embodiment of the present invention.

It is a well-known fact in analytic and differential geometry that for any smooth two-dimensional surface embedded into a three-dimensional Euclidean space a local surface normal can be constructed and erected at a point on this surface. Directions in three-dimensional Euclidean space at a point on this surface can then be given as direction vectors which are parametrized by two direction angles in respect of the surface normal. A common choice for direction angles include an elevation angle being the angle formed by the surface normal and the direction vector in a plane spanned by the surface normal and the direction vector and an azimuthal angle being the angle formed between a projection of the direction vector onto the tangent plane at this point on the surface (perpendicular to the surface normal) and a reference direction/line in that same tangent plane. There is no preferred orientation for such a reference direction/line in the tangent plane, but for embodiments of the invention, a natural choice for the reference direction/line in the tangent plane may be adopted by selecting the local radius of curvature of the ridges or grooves forming part of a corrugated surface as the reference direction/line. The tangent plane then corresponds to the surface which is corrugated. This is also illustrated in FIG. 5.

In a first aspect, embodiments of the present invention relate to an integrated wavelength-selective filter device. The integrated wavelength-selective filter device comprises a first optical element patterned in or on a substrate and configured for receiving radiation incident thereon and for directing at least partially said received radiation into a direction defined by a first angle (a). The first optical element may for example be a mirror or a grating. The first angle (a) typically depends on the wavelength. The filter device also comprises a second optical element patterned in or on a substrate and extending longitudinally and arranged distantly to the first element. The second optical element is a diffractive element. The second optical element is being configured for receiving the directed radiation under an angle of incidence and is being adapted for diffracting the directed radiation under a second diffraction angle. The angle of incidence and the second diffraction angle both depend on the wavelength. The first optical element is directing the received radiation into a propagation medium, through which the directed received radiation is propagating until it is received at the second optical element. The propagation medium is formed from a material being different from and having a smaller refractive index than any one substrate material. Furthermore, the second optical element is configured such that the second diffraction angle is such that for a single reference wavelength the diffracted radiation is directed into the propagation medium for advancing therein towards a predetermined position on the first optical element or on a further optical element for filtering radiation having a wavelength substantially matching the reference wavelength from radiation having a substantially different wavelength, whereby the reference wavelength is uniquely determined for the entire device.

In some embodiments, the second optical element is configured for back-reflecting the directed radiation into the propagation medium for advancing therein towards the first optical element along the same elevation angular direction with respect to a flat surface of the substrate on or into which the second optical element is patterned, but with opposite propagation sense as compared to the radiation incident on the second optical element for coupling out the filtered radiation. In other embodiments, the second optical element is configured in an off-axis configuration so as to diffract backwards the radiation incident on the second optical element along a different azimuthal angular direction, e.g. a slightly different azimuthal angular direction, as compared to the azimuthal angular direction of the incident radiation incident on the second optical element. An azimuthal angular direction may be defined with respect to a flat surface of the substrate on or into which the second optical element is patterned. The filter device then may further comprise a further optical element having similar characteristics as the first optical element and being configured for coupling out the filtered radiation.

Standard and optional features of embodiments of the present invention will now be described in more detail, with reference to different types of embodiments.

An integrated, optical wavelength selective filter according to embodiments of the present invention typically may comprise an input port, which is in some embodiments also acting as an output port. The input port typically may be configured for receiving incident polychromatic radiation and for delivering filtered, nearly monochromatic radiation. The optical wavelength selective filter thus in some embodiments also comprises a first optical element typically connected to the input port for dispersing polychromatic radiation incident on it, optionally one or more reflective surfaces for folding or redirecting a path of a radiation beam, and a second optical element, which is used in a back-reflective configuration. The input port is preferably of the waveguide kind, e.g. the facet or cross-section of an integrated ridge, rib, or slotted waveguide on or buried in a substrate, e.g. an integrated waveguide patterned into a sapphire or polymer substrate, into a silicon on insulator (SOI), indium phosphide, gallium arsenide, or other semiconductor or dielectric platform, but is not limited thereto. Even more preferably, the input port of the waveguide kind leads to a confinement of incident polychromatic radiation into a single guided mode, e.g. the fundamental mode of the waveguide, whereby the single guided mode/fundamental mode is parametrized by the wavelength. Other types of input port may be apertures or exit pupils of integrated optical elements, such as faces of a microprism, pupils of lenses or lens systems, e.g. pupils of microscopic ball lenses bonded onto the substrate of the integrated optical circuit. In such cases the incident radiation is preferably in an unconfined fundamental mode, e.g. a zeroth order collimated Gaussian beam. The fundamental modes are advantageous as they offer a spatially more localized incident radiation, which allows for reduced dimensions of light guiding, light bending or light dispersing structures, e.g. narrower ridge waveguides, shorter gratings, etc. This enables a more compact and cost-effective design of the integrated optical filter and of integrated optical systems including this filter.

The first optical element is preferably provided as an integrated grating, e.g. a shallow or deep etched grating in an SOI platform. For a first optical element of the grating type, it is furthermore preferred that only few diffracted orders are excited, most preferably a single diffractive order. This has the advantage that possible sources of stray light and background signals are avoided and that the diffraction efficiency into one or only a few orders is increased. This improves the overall optical filter throughput in a passband by way of reducing insertion losses and therefore increasing the stopband attenuation factor. If required in some embodiments of the invention, a top cladding of the integrated waveguide and the first optical element, e.g. of an integrated grating, is preferably air, although embodiments are not limited thereto. Indeed any other materials that have a substantially weaker temperature-dependent refractive index (i.e. thermo-optic coefficient) compared to the effective refractive index of the integrated waveguide or first integrated grating are suitable too. Alternatively, the first optical element may be a bonded ruled or holographic grating, a bonded microprism, an arrayed phase grating of the AWG kind, a cleaved waveguide facet, mirroring surface, etc.

The second optical element is preferably provided as an integrated grating too, e.g. a shallow or deep etched grating in an SOI platform. Even more preferably, the second optical element is a blazed grating so as to maximize diffraction efficiency. Alternatively, the second optical element may also be a bonded ruled or holographic grating. Both the first and second optical elements may have one or more of their surfaces exposed to the radiation signal conformally coated by thin layers so as to improve their reflection or transmission characteristics within the desired filter passband range. As the first optical element is operating in a transmissive regime, said conformal coating may be a thin conformal antireflection coating. For the second optical element operating in a reflection regime, a thin conformal metal layer film or a thin conformal reflective coating may be applied.

When polychromatic radiation is incident onto the first optical element under a first angle of incidence, it is not or partially dispersed into different angular directions, i.e. different deflection angles dependent on the wavelength. A dispersion into different angular directions may also be the consequence of free propagation of the re-directed received radiation within the propagation medium. The second optical element is distantly arranged in such a manner with respect to the first optical element that the at least partially deflected polychromatic radiation is reaching it under a second angle of incidence without major hindrance. That is a substantially loss-free radiation propagation path is established between the first optical element and the second optical element. The second optical element is in some embodiments configured to back-reflect radiation within a narrowband region around a center wavelength of the integrated optical filter in such a way that it is essentially travelling back along the same radiation propagation path between the first optical element and the second optical element but in opposite direction, i.e. the second angle of incidence is coincident with the diffraction angle associated with the second optical element for those wavelengths. Radiation wavelengths in the filter stopband are diffracted into different diffraction angles such that the return path of radiation signals for those wavelengths is different from the initial path. As a consequence, radiation signals for those wavelengths may encounter major hindrances, e.g. they are absorbed, miss the first optical element, or are not guided back to the input port/output port. In any case they are efficiently suppressed. This filtering effect may be amplified by lengthening the initial path by means of one or more reflective surfaces, e.g. by total internal reflection on surfaces, metallic or dielectric mirrors, e.g. thin metallic films or dielectric thin film coatings applied to surfaces, such that even small differences in diffraction angles are leading to increasingly larger spatial separation along the return path. Alternatively to the described configuration, the second optical element may be configured off-axis and the radiation may be coupled out through a third optical element, being different from the first optical element but comprising the same or substantially similar properties as the first optical element. The angle of the diffracted wave at the second optical element then is different from the angle of incidence on the second optical element. This can for example be a significantly different angle, or it can, in some embodiments, also be only a difference in the azimuthal component of the angles concerned. In some embodiments the difference may be small, e.g. sufficient to direct the radiation back to a third optical element lying at a different place but close to the first optical element.

By way of illustration, embodiments of the present invention not being limited thereto, some particular examples of embodiments will further be described, illustrating standard and optional features.

FIG. 1 is a schematic, cross-sectional view of an integrated photonic chip realizing an athermal, optical wavelength selective filter 10. The integrated photonic chip is not limited to the portion that is shown in FIG. 1 and may comprise additional components that are not shown, for example curved input grating couplers, tapered, wide waveguides, or bonded prism couplers, for coupling light into the integrated photonic chip, e.g. light emitted from a proximate fiber end facet or a focused light beam incident onto the integrated photonic chip, as well as routing, splitting, and combining means, e.g. bent waveguides, broadband directional couplers, etc.

An input facet or cross-section of an integrated waveguide 131, which may be single-mode silicon waveguide formed in a silicon layer 12 on top of a buried silicon oxide substrate 11, may act as an input port 13 to the integrated optical, wavelength selective filter 10. The substrate 11 may be of a different material, e.g. sapphire, GaAs, InP, polymer, etc., and may also comprise more than just a single material layer, e.g. the substrate 11 may be a buried silicon oxide layer on top of a silicon wafer layer. Moreover, the silicon layer 12, hereinafter referred to as waveguide layer 12, is not restricted to be a silicon layer, but other material layers may be selected, for example InP, Ge, SiGe, SiN, SiON, glasses in general, and chalcogens in particular, quaternary materials in III-V platforms, such as InGaAsP in InP platforms, etc., the particular choice depending on the targeted center wavelength of the filter, temperature range, design rules, etc.

The integrated waveguide 131 is connected to a first optical element in the present example being an integrated grating 14, formed within the same layer 12 as the integrated waveguide 131, and incident radiation is directed from the input port 13, e.g. the cross-section or facet of the integrated waveguide 131, to the first integrated grating 14. According to this embodiment, the first integrated grating 14 is chosen as a first optical element. It may be a grating with rectangular grating teeth obtained by selectively etching the waveguide layer 12. However, different shapes for the grating 14 are possible too, e.g. triangular, wedged, sawtooth or sinusoidal. The first integrated grating 14 is preferably optimized for the center wavelength of the optical filter 10, for instance by way of selecting a particular grating period, so that light of the center wavelength is diffracted into a suitable angular range under changing temperatures, or by way of optimizing the grating profile for a highly efficient diffraction regime for the center wavelength. For instance, a grating pitch of approximately 810 nm diffracts the wavelength of 1.55 um to an angle of 45 degrees at room temperature if the grating is a rectangular grating shallowly etched into a silicon waveguide, the present invention not being limited hereto. It may also be advantageous to introduce a chirp into the grating period of the first integrated grating so that the associated diffraction bandwidth is increased and undesirable back-reflections at the first integrated grating 14 or its end facet are reduced. Alternatively, it is possible to provide an off-axis grating or grating coupler for which the reflections are known to be particularly low. Moreover, the first integrated grating 14 is preferably configured to only diffract incident light into a single order, e.g. the order m=−1. This is of advantage inasmuch as overlapping diffraction orders are avoided which reduces the complexity of design considerations. It also avoids the spreading of signal energy into multiple orders which may result in additional losses and a weaker output signal, e.g. the stopband attenuation factor may be fairly low. However, if design rules preclude grating periods which are too small to be correctly fabricated, it might be necessary to design higher-order first integrated gratings 14, e.g. having orders |m|>2. Furthermore, it may be beneficial to coat the surface contour of the first integrated grating, e.g. by applying a thin antireflection coating, so as to minimize reflection losses over the passband wavelength range when filtered light in this range is re-entering the first integrated grating 14 prior to being guided back to the input port 13, which is also acting as an output port.

Figure 3:
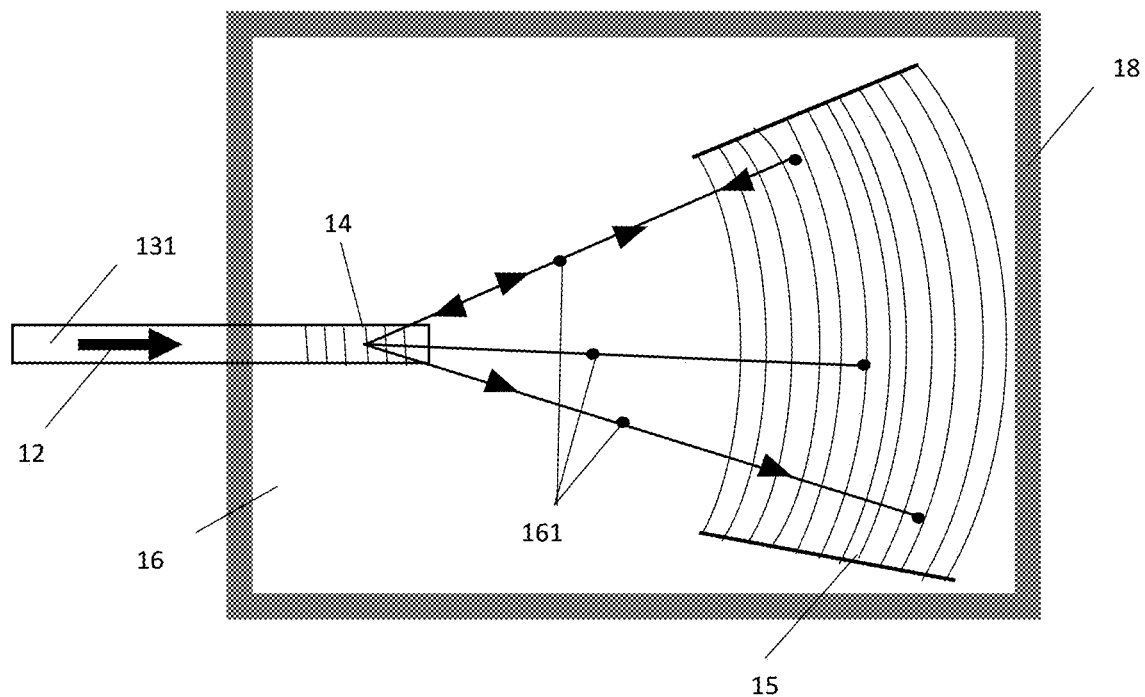
FIG. 3 is a schematic top-down view of an integrated wavelength-selective filter device according to a first embodiment of the present invention, comprising two integrated gratings as first and second optical elements and an additional reflective surface.

A second optical element 15 in the present example being an integrated grating 15 is patterned into the same silicon layer 12 as both the integrated waveguide 131 and the first integrated grating 14, but is not directly connected to the first integrated grating 14 via this very same silicon layer 12, e.g. there exists a gap region between the first and second integrated gratings 14, 15 in the cross-sectional view of FIG. 1. In the present embodiment, the so distantly formed first and second integrated gratings 14, 15 may be separated by an interval preferably ranging between 0.5 mm and 10 mm, most preferably between 1 mm and 5 mm. The second integrated grating 15 is typically designed to be a blazed grating. This typically leads to less reflection losses, especially if the second integrated grating 15 is in its most preferred configuration: the Littrow configuration. The Littrow configuration is a particular case for which the blaze angle equals the angle of incidence and also equals the diffraction angle for a given diffraction order of interest. Here, the diffraction angle is determined with respect to the grating surface normal and an orientation opposite to the orientation of the incident angle. Under such a configuration, the grating efficiency is typically greatly enhanced in a specific diffraction order. To further enhance the efficiency of the second integrated grating 15, its surface contour may be coated by a thin reflective film, e.g. a thin layer of aluminum, gold or silver, or a thin reflective dielectric layer stack. A blazed grating 15 may be manufactured by anisotropic wet or dry etching, wherein the etchant, the etchant concentration, the etchant's selectivity with respect to crystal surfaces, the crystal/wafer orientation and crystal/wafer cut angle, etc., may be chosen to obtain at least one specific blaze angle. For instance, if the waveguide layer 12 is a [100]-oriented crystalline silicon wafer layer, the wet etchants may be KOH or TMAH, such that an etch stop occurs on {111}-planes at an angle of 54.7°. A more complex fabrication of the blazed grating may tune the blaze angle so as to account for the longitudinal change of the angle of light incident onto the second integrated grating 15 and may also account for the curvature of the grating lines in a plane parallel to the substrate 11. For instance, a focused ion beam etching process may be used to fabricate the more complex blazed grating 15. However, the second integrated grating 15 may also be designed to exhibit a surface contour that is rectangular, sinusoidal, stair-case profile, etc. The grating lines 151 are generally not just straight lines (as seen in a plane parallel to the substrate 11 not visible in FIG. 1) but may adapt various line shapes, e.g. follow a circular or elliptical line shape in a plane parallel to the substrate 11. This is illustrated in FIG. 3 which is a top view of the present embodiment. This is an advantage if conical diffraction is required, for example if the first integrated grating 14 of the present invention has much smaller dimensions than the second integrated grating 15 or than the distance between them and the first integrated grating 14 may be reasonably approximated as a directional point emitter the emission angle of which is wavelength dependent. Then the angle of incidence is uniform along the grating lines 151 of the second integrated grating 15.

One or more standoffs 18, e.g. two standoff columns 18 in FIG. 1 or a single rectangular path, may be arranged on both sides of the optical integrated filter 10, adjacent to the first and second integrated gratings 14, 15. One or more standoffs 18 may be made from alumina, sapphire, cermet, steatite, the present invention not being limited thereto.

The standoffs 18 may be selectively grown, sputtered, deposited by evaporation techniques, or, more preferably, directly bonded onto either the substrate 11, where it is exposed, or the waveguide layer 12, where it is not removed. The standoffs 18 may extend 0.1 mm to 5 mm, preferably 0.1 mm to 2 mm, in a vertical direction, which, for the present embodiment, coincides with the both the substrate normal and the grating normals 121.

A second substrate 16, which may or may not comprise additional material layers, as the case may be, is suspended at a height h over at least an area of the substantially planar waveguide layer 12 comprising the first and second integrated gratings 14, 15 as well as the gap region between them, whereby the height h corresponds to the height of the standoffs 18 by which the second substrate 16 is structurally supported. Such a second substrate may for example be made from fused quartz. A surface portion 161 of the second substrate 16 facing the waveguide layer 12 may additionally comprise a thin metallic film, e.g. a thin gold or silver film, or a thin reflective coating, so as to further increase the reflectivity and mirroring ability of this surface portion 161. This is particularly true for substrates 16 that are substantially transmissive for light incident on their surfaces. The surface portion 161 is located in such a way that it is at least facing the gap region between the distantly arranges first and second integrated gratings 14, 15 and more preferably further extends laterally, such that a light ray 19 of the center wavelength, emitted by the first integrated grating 14 or deflected back by the second integrated grating 15, is hitting and reflecting off it throughout the whole targeted temperature range of the filter 10. Choosing a larger extent of the surface portion 161 is also advantageous in view of alignment tolerances, since a small offset during the alignment of the surface portion 161 with respect to the first and second integrated gratings 14, 15 will have no noticeable effect on its mirroring ability if it is provided with an extra margin. An at least partially confined space 17 is defined by the boundary walls of the standoffs 18 and the suspended substrate 16 and is preferably filled with air. That is both at least a portion of the integrated waveguide 131 and the whole first and second integrated gratings 14, 15 have an air top cladding. Although air is a preferred cladding medium for the present embodiment because of its natural occurrence and the fact that no special steps for its removal are necessary, alternative embodiments of the present invention may provide a different cladding medium. This may for instance be an inert atmosphere or vacuum, if the space 17 is an entirely confined, hermetically sealed space. In still other embodiments of the invention, the space 17 may be filled with a solid dielectric material, which preferably has a low thermo-optic coefficient as well as a thermal expansion coefficient matched to that of the two substrates, so as not to excessively deform the substrate 16 and change locally the reflectivity of its surface portion 161. Albeit the fact that, for the ease of manufacture and integration, planar substrates 16 are preferred in the present embodiment, it is possible to provide a curved or otherwise surface contoured substrate 16 such that the surface portion 161 also has focusing means, e.g. for refocusing a beam of light that is, due to the small numerical aperture of the first integrated grating 14, a diverging beam.

In operation, the integrated optical filter 10 receives a polychromatic light signal at its input port 13. The integrated waveguide 131 is guiding this polychromatic signal in a substantially loss-free manner to the first integrated grating 14, where it is coupled out into the air-filled space 17 by means of diffraction into an order m=−1. Because of the waveguiding effect, the incident polychromatic light signal propagates at a first angle of incidence which is essentially 90 deg with respect to the grating normal 121. A central angle of deflection α (first angle) is obtained from the grating formula given in Eq. 1, wherein $n_a$ refers to the refractive index of cladding medium in the space 17, e.g. air, $n_{eff}$ stands for the real part of the effective refractive index of the corrugated leaky waveguide that is defined by the first integrated grating 14, m is the diffraction order, λ is a wavelength component of the polychromatic signal, and Λ is the grating period of the first integrated grating 14.

$$n_a \sin\alpha = n_{eff} + \frac{m\lambda}{\Lambda} \quad (1)$$

It appears from Eq. 1 that the deflection angle α is wavelength dependent. A light ray 19 according to a particular wavelength component λ of the polychromatic light signal, e.g. the center wavelength, is travelling through the medium of the space 17 under the deflection angle α with respect to the grating normal 121 until it hits the reflective surface portion 161, e.g. a mirroring surface, e.g. a thin gold film deposited onto the substrate 16, wherefrom it is reflected so as to further travel through the medium of the space 17. Eventually this light ray 19 is incident onto the corrugated surface of the second integrated grating 15 under a second angle of incidence, which, incidentally, is the very same angle α. This is the consequence of the mirror action of the surface portion 161 which is merely folding the path of the light ray 19 and of the arrangement of the first and second integrated grating on the same plane, e.g. the surface of the substrate 11, so that their normals 121 are collinear. At the second integrated grating 15, the polychromatic light signal is diffracted again; this time a diffraction angle β is calculated according to the grating formula given in Eq. 2, wherein k indicates the diffraction order, λ a particular wavelength component of the polychromatic light signal, and D the local grating period at the position where the light ray 19 encounters the surface of the second integrated grating 15. Due to the wavelength dependent angle of deflection, each wavelength component of the polychromatic light signal has a slightly different position of incidence on said second integrated grating 15.

$$n_a(\sin\alpha + \sin\beta) = \frac{k\lambda}{D} \quad (2)$$

For the center wavelength $\lambda_c$ of the optical filter 10, the grating period D of the second integrated grating 15 is set, at least locally in a portion of the grating 15 illuminated by a pencil beam or diverging beam of light corresponding to the center wavelength, to the value that enables the operation of the second integrated grating 15 in a Littrow condition: α=β or second angle of incidence equals angle of diffraction. Hence for a Littrow configuration in a first order k=1, the period D is set to the expression given in Eq. 3, wherein the second equivalence is a direct consequence of Eq. 1 with m=−1.

$$D = \frac{\lambda_c}{2n_a(\lambda_c)\sin\alpha(\lambda_c)} = \frac{\Lambda}{2}\left(\frac{n_{eff}(\lambda_c)\Lambda}{\lambda_c} - 1\right)^{-1} \quad (3)$$

Eq. 3 only holds for the central angular direction of the beam leaving the first optical element. Due to free space diffraction this beam is diverging and therefore consists of a plurality of directions. These different directions land on different locations of the second optical element. Therefore, in order to ensure that the second optical element satisfies the Littrow condition in all locations for the same wavelength, it will need to be chirped. For the present embodiment, the landing location, s, representing the distance of a given location on the second optical element to the center of the first optical element, is determined by the filter geometry and is given in Eq. 4. This introduces a chirp or a position dependent grating period D for the second integrated grating 15.

$$s = 2h \tan \alpha \quad (4)$$

In view of the definition of s, the grating of the second optical element will have circularly curved grating grooves if the first optical element essentially behaves as a point source emitter. This ensures that the second optical element converts the two-dimensionally diverging incident beam into a two-dimensionally converging diffracted beam, that will refocus on the first optical element for the reference/center wavelength.

Combining Eq. 3 and Eq. 4 the position dependent, i.e. locally varying, grating period D(s) of the second integrated grating 15 can be derived and is noted in Eq. 5.

$$D(s) = \frac{\lambda_c}{2n_a(\lambda_c, T)} \sqrt{1 + \left(\frac{2h}{s}\right)^2} \quad (5)$$

This chirped or spatially varying grating period D(s) of the second integrated grating 15 now ensures that the Littrow condition is fulfilled for the center wavelength regardless of its respective deflection angle α (which is equal to the second angle of incidence). As a consequence, light signals characterized by a wavelength that substantially differs from the center wavelength are diffracted into angular directions β that are distinctively different from the second angle of incidence α. Hence, only a light in a narrow wavelength range close to the center wavelength, the filter passband, is reflected back along essentially the same propagation path as on its way to the second integrated grating 15 and therefore is efficiently coupled back into the first integrated grating 14 before being guided back to the input port 13, which also acts as the filter output port. Light signals characterized by wavelengths outside the filter passband, i.e. in the filter stopband, however, is not coupled back to the input port 13, due to the relatively small numerical aperture of the first integrated grating 14. As a matter of fact, light signals within the filter stopband are rejected as they are spatially deviated from the location of the first integrated grating 14 on their return path. This spatial separation effect is even more amplified by the folded propagation paths of light rays 19, e.g. by the reflective surface portion 161. This is true for any change in temperature that affects the deflection angle α of the first integrated grating 14 by virtue of the temperature dependence of refractive indices $n_{eff}$ and $n_a$, e.g. by virtue of their thermo-optic coefficients.

Figure 4:
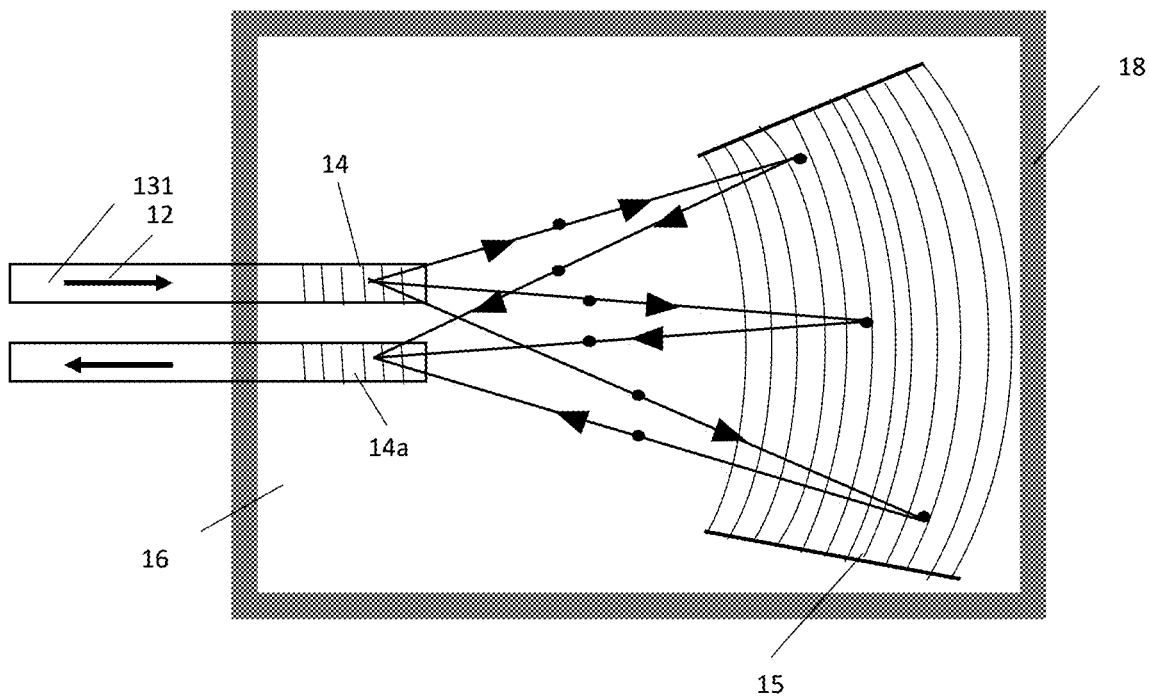
FIG. 4 is a schematic top-down view of an integrated wavelength-selective filter device being positioned off-axis, according to an embodiment of the present invention, the top-down view being levelled at the height of a flat surface comprised by a second substrate.

In an alternative embodiment the second optical element is positioned off-axis and radiation is coupled out of the filter, after interaction at the second optical element, by using a further optical element 14a and optionally also a separate outcoupling waveguide. The principle is illustrated in FIG. 4 and also in FIG. 5. As indicated above, the second optical element 15 thus is positioned off-axis and the azimuthal angle "−φ" of the diffracted wave at the second optical element 15 then is different from the azimuthal angle "−φ" of incidence on the second optical element 15, e.g. the second optical element 15 in off-axis configuration acts like a specular reflector in the azimuthal direction, whereas the elevation angle "θ" of the diffracted wave at the second optical element 15 is substantially equal (e.g. neglecting variations due to processing imperfections) to the elevation angle "θ" of the incoming wave incident on the second optical element 15, e.g. the e.g. the second optical element 15 in off-axis configuration still acts like an ideal angle-preserving back-reflector in the elevation direction. The complete angle of incidence α, comprising an azimuthal angle component and an elevation angle component, however, is different from the diffraction angle β of the outgoing diffracted wave. This difference between the angle of incidence α and the diffraction angle β can for example be a significantly different angle (e.g. significantly differing azimuthal angle and elevation angle components for α and β), or it can, in some embodiments, also be only a difference in the azimuthal component of the angles concerned. In some embodiments the difference may be small, e.g. sufficient to direct the radiation back to a third optical element lying at a different place but close to the first optical element. In the exemplary embodiment of FIG. 5, only the azimuthal angle component φ is affected by the off-axis arrangement of the second optical element 15, whereas the elevation angle component θ is preserved. More specifically, the azimuthal angle component φ is reflected about the local radius of curvature in the plane of the flat substrate 11, that is the second optical element 15 in off-axis configuration is acting like a specular mirror in this plane. It is also typical for an off-axis configuration that the local radius of curvature forms a non-zero angle with respect to the line joining the centers of the first and second optical elements 14, 15 in that plane.

For embodiments of the present invention which rely on the reflecting quality of a surface portion 161 of the second substrate 16, a tilt angle, defined for such a surface portion in respect of a flat surface of first substrate 11, or the waveguide layer 12 patterned into or on the first substrate 11, it is facing, ought to be controlled carefully for a good functioning of the integrated wavelength-selective filter device in operation. Indeed, a tilt angle being close to zero degree is preferred, as demonstrated in the following sensitivity analysis with respect to possible tilt angles. Tilt angles which are substantially zero correspond to the situation in which the two flat surfaces of the respective first and second substrates facing each other are parallel. Referring briefly to FIG. 5 and the xyz-coordinate system defined therein, two possible tilt angles $\omega_x$ and $\omega_y$ are representative of a rotation of the mirroring surface portion 161, or of the second substrate 16 on which the surface portion 161 is formed, about the x-axis and the y-axis, respectively. It is noted that a rotation about the x-axis causes displacements of light rays, propagating between the first integrated grating 14 and the second integrated grating 15, only in the yz-plane. A rotation about the y-axis, however, will cause displacements of light rays, propagating between the first integrated grating 14 and the second integrated grating 15, in the xz-plane alone.

With regard to tilt angles $\omega_x$ for rotations about the x-axis, the following displacement of a light ray along the y-direction Δy is observed in embodiments in which the second optical element 15 is diffracting the incident light ray back into the propagation medium and towards a location on the first optical element 14, which emitted the light ray into the propagation medium in the first place (e.g. the embodiments referred to in FIG. 3). A walk-off of the backward-diffracted light ray by more than a critical distance $\Delta y_{crit}$ may have the result that the backward-propagating light ray misses the aperture of the first optical element 14 and therefore, is not coupled out from the wavelength-selective filter device as originally intended. That is, in operation, the tilt angle $\omega_x$ is precisely controlled or adjusted such that $\Delta y < \Delta y_{crit}$. Geometry teaches that the displacement $\Delta y$ may be expressed as $$\Delta y = h \frac{2\tan 2\omega_x + \tan 4\omega_x(1 + \tan\omega_x \tan 2\omega_x)}{1 - \tan\omega_x \tan 2\omega_x}.$$

Here, h is the reference distance in z-direction at which the mirroring surface portion 161 (e.g. mirror) is positioned with respect to the flat surface of the first substrate 11, e.g. the waveguide layer 12 formed thereon. For small tilt angles $\omega_x$, the following first order approximation holds:

$$\Delta y \approx 8\omega_x h.$$

Assuming, for example, that a critical displacement $\Delta y_{crit} = 3$ μm can be tolerated for a distance h=1 mm, this implies that the tilt angle $\omega_x$ for the mirroring surface portion 161 (e.g. mirror) with respect to the flat surface of the first substrate 11, e.g. the waveguide layer 12, is accurately controlled during attachment and positioning of the mirroring surface portion 161, or is accurately adjusted during device operation, ensuring that tilt angles w, are not exceeding 0.02 deg (arc degree). Continuing the above sensitivity analysis with regard to tilt angles $\omega_y$ for rotations about the y-axis, the following displacement of a light ray along the x-direction δx is observed on the forward path from the light ray emitting first optical element 14 towards the second optical element 15:

$$\delta x = h \frac{\tan\alpha + \tan(\alpha + 2\omega_y)}{1 - \tan\alpha\tan\omega_y} - 2h\tan\alpha \approx 2\omega_y h \frac{1 + 2\sin^2\alpha}{\cos^2\alpha},$$

wherein a first order approximation has been made in respect of the small tilt angle $\omega_y$ and wherein h is the reference distance in z-direction at the first optical element 14 at which the mirroring surface portion 161 (e.g. mirror) is positioned with respect to the flat surface of the first substrate 11, e.g. the waveguide layer 12 formed thereon. The angle α refers to reference deflection angle for the first optical element 14 (first angle) and also corresponds to the angle of incidence for the second optical element 15; this same angle α is shown in FIG. 1 and discussed in relation to Eq. 1. The second optical element 15, e.g. a chirped Littrow grating having a chirped period D(s=x), is designed to back-reflect the incident light ray at the reference wavelength $\lambda_c$ if the angle of incidence equates to a at the reference distance $x=x_0=2h \tan(\alpha)$ in the absence of tilts of the mirroring surface portion 161. In the presence of a tilt angle $\omega_y$ for a rotation about the y-axis, the second angle of incidence shifts to $\alpha + 2\omega_y$ and the corresponding angle of diffraction β for the second optical element 15 does no longer fulfill the Littrow condition α=β at a shifted distance $x = x_0 + \delta x$, but slightly deviates therefrom by an amount $$\Delta\beta = -\frac{\delta D}{D_0} 2\tan\alpha - 2\omega_y = \frac{\delta x}{x_0} 2\sin 2\alpha - 2\omega_y \approx 2\omega_y \sin^2\alpha,$$

whereby the back-diffracted light ray is displaced with its (emission) point of deflection at the first optical element 14 (e.g. x=0), when returning to the same, after another reflection off the tilted surface portion 161. Analytic geometry then teaches that the final displacement Δx with respect to point of deflection at the first optical element 14 (e.g. the center of its aperture at x=0) is given by $$\Delta x = 2h\tan\alpha + \delta x - \frac{\begin{bmatrix} h + 2h\tan\omega_y\tan\alpha + \\ \delta x\tan\omega_y \end{bmatrix} \begin{bmatrix} \tan(\alpha + 2\omega_y\sin^2\alpha) + \\ \tan(\alpha - 2\omega_y\cos^2\alpha) \end{bmatrix}}{1 + \tan\omega_y\tan(\alpha + 2\omega_y\sin^2\alpha)}$$

$$\Delta x \approx 4\omega_y h.$$

Here, a first order approximation for small title angles $\omega_y$ has been used again. Hence, for similar critical displacements $\Delta x_{crit} = 3$ μm and height distance h=1 mm of the mirroring surface portion 161 at the first optical element 14 (e.g. at x=0 mm), the requirements for the control of the tilt angle $\omega_y$ are less stringent, e.g. twice the value of the critical tilt angle $\omega_{crit}$ can be tolerated, e.g. 0.04 deg.

The above tilt sensitivity analysis is particularly useful when determining error tolerances for alignment of the reflective element 161, e.g. mirror, provided above or below the substrate, supporting the first and second optical element, and with respect to which it is aligned.

The tilt sensitivity analysis can be repeated for embodiments in which a further optical element 14a is used in combination with an off-axis arrangement of the second optical element 15 for coupling radiation out of the filter device, for example in embodiments which are shown in FIG. 3 or FIG. 5.

Figure 2:
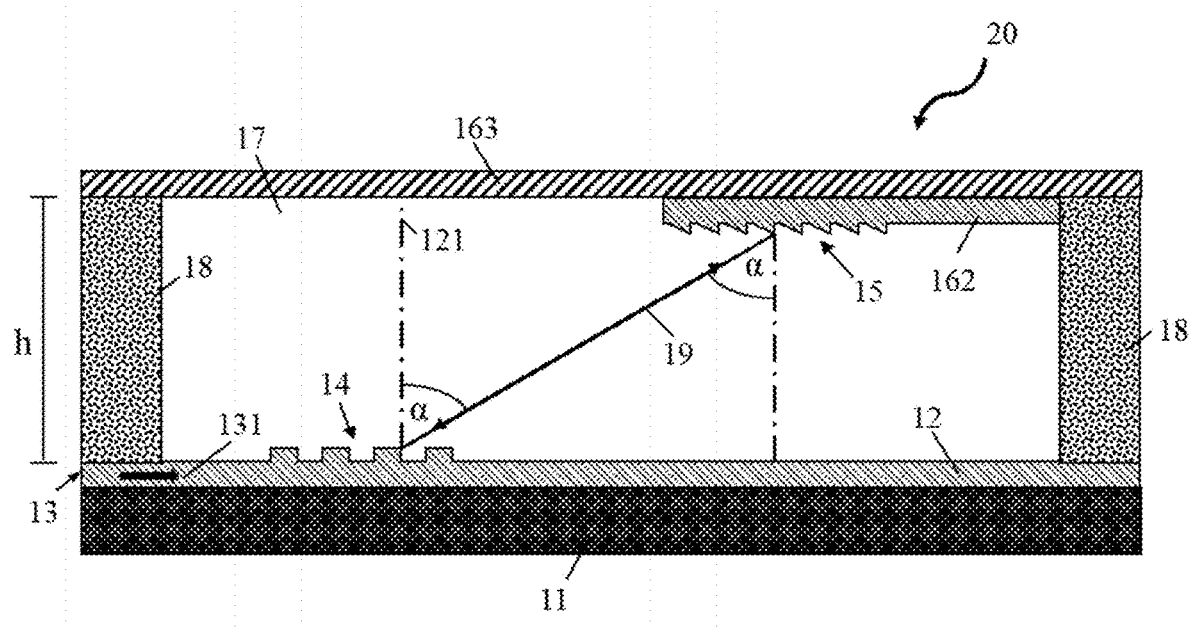
FIG. 2 is a schematic cross-sectional view of an integrated wavelength-selective filter device according to a second embodiment of the invention, comprising two integrated gratings as first and second optical elements respectively arranged on a lower first flat surface and an upper second flat surface, and without any additional reflective surfaces.

FIG. 2 is a schematic cross-sectional view of an optical integrated filter 20 according to a second particular embodiment of the first aspect of the present invention. It differs from the first embodiment in that a reflective surface 161 for folding the propagation path of light rays 19 is absent and that the second integrated grating 15 is formed in a different waveguide layer 162 on a different substrate 163. The substrate 163 is bonded or otherwise attached to the stand-offs 18 such that the contoured surface of the second integrated grating 15 is facing the waveguide layer 12.

This may be achieved by way of dicing and flip-chip mounting a similar photonic integrated chip comprising the second integrated grating 15 onto the primary photonic integrated chip comprising the input port 13, waveguide 131, and first integrated grating 13. Similar photonic integrated chips from a same wafer, e.g. a silicon on insulator wafer carrying photonic chips, have the advantage of highly uniform manufacturing results, e.g. highly uniform etch depths, waveguide line widths, etc. This increases the good matching of material or geometric properties relative to the first and second integrated gratings 14, 15, located on different chips. However, it may also be advantageous to manufacture the second integrated grating 15 in a different platform, thereby affording a larger choice of materials and design parameters.

To increase the spatial separation of light signals having wavelengths different from the center wavelength of the filter 20, the height h of the stand-offs 18 may be larger than for the first embodiment.

The space 17 at least partially confined by the standoffs 18 and the second substrate 163 is preferably filled with air, but other transparent, dielectric materials are also possible.

By way of illustration, embodiments of the present invention not being limited thereto, operation of an example of a temperature insensitive reflective passband filter according to the exemplary system as shown in FIG. 1 could be explained based on the following considerations.

Incident radiation is in the example of FIG. 1 first diffracted by the grating coupler 14 and thereafter back-reflected by the chirped Littrow grating 15.

The coupling at the grating coupler can be expressed as in Eq. 1, but assuming air or vacuum with refractive index $n_a=1$ to be the propagation medium for light rays between the first optical element 14 and the second optical element 15, which results in the following equations:

$$n_{eff} \cdot \frac{2\pi}{\lambda} - \frac{2\pi}{\Lambda} = \frac{2\pi}{\lambda}\sin\alpha \Leftrightarrow \frac{1}{\Lambda} = \frac{1}{\lambda}(n_{eff} - \sin\alpha) \Leftrightarrow \Lambda = \frac{\lambda}{(n_{eff} - \sin\alpha)}$$

with $\alpha$ the central angle (deflection angle) under which the radiation is diffracted by the grating coupler 14 with respect to the grating surface normal, $n_{eff}$ the effective refractive index and $\Lambda$ being the grating period of the grating coupler.

The coupling at the chirped Littrow grating can be expressed by the following equations, still assuming air or vacuum with refractive index $n_a=1$ to be the propagation medium for light rays between the first optical element 14 and the second optical element 15:

$$2\sin\alpha \frac{2\pi}{\lambda} = K_{Lg} = \frac{2\pi}{D} \Leftrightarrow D = \frac{\lambda}{2\sin\alpha} \text{ or } D\sin\alpha = \frac{\lambda}{2}$$

with $K_{Lg}$ being the local grating K-vector of the Littrow grating and D its local grating period or pitch.

A ray leaving the grating coupler at a general angle $\alpha$ (not limited to the central angle) will land on the Littrow grating at a distance s defined by $$s = 2h \tan\alpha$$

At this position the pitch D needs to be $$\frac{\lambda}{2\sin\alpha}.$$

Hence the chirped pitch is described by $$D(s) = \frac{\lambda}{2\sin\alpha} \text{ with } \alpha = \arctan\left(\frac{s}{2h}\right)$$

$$D(s) = \frac{\lambda}{2\sin\left(\arctan\left(\frac{s}{2h}\right)\right)}$$

$$D(s) = \frac{\lambda}{2}\sqrt{1 + \left(\frac{2h}{s}\right)^2}$$

Hence a given chirp rate will only occur for one value of h. But an overall scaling of D will simply scale the passband $\lambda$.

The temperature insensitivity is influenced by two effects. A temperature difference results on the one hand in a thermo-optic effect (a change in the effective refractive index) and on the other hand on a thermal expansion.

The change in effective refractive index has no influence on the spectral operation of the filter, since a change of the angle $\alpha$ caused by the change in effective refractive index $n_{eff}$ has no effect on the operation as long as the thermo-optic effect for the propagation medium filling the confined space 17 is orders of magnitude smaller than the thermo-optic effect related to the effective refractive index of the first optical element 14. This is in general true if the propagation medium is a gas, e.g. air or vacuum (as a rarified gas), for which $dn_a/dT \ll dn_{eff}/dT$, e.g. $dn_a/dT \approx 10^{-6} \ll 10^{-4} \, dn_{eff}/dT$.

With respect to the thermal expansion, the following considerations are made: In the current example, where the chip is considered to be a silicon based chip, all dimensions of the chip expand with a thermal expansion coefficient $\vartheta_{Si}$. As a result, the new position $s_{new}$ of a particular grating tooth is given by:

$$s_{new} = s_{old}(1 + \vartheta_{Si}\Delta T)$$

Also the grating period itself will expand $$D_{new} = D_{old}(1 + \vartheta_{Si}\Delta T)$$

The stand-off also expands. Assume that the stand-off material has a thermal expansion coefficient $\vartheta_{so}$ resulting in a standoff distance $h_{new}$ $$h_{new} = h_{old}(1 + \vartheta_{so}\Delta T)$$

The corresponding new wavelength $\lambda_{new}$ (relative to the old wavelength $\lambda_{old}$) caused by the thermal expansion can be determined as follows:

A ray with deflection angle $\alpha$, being equal to the second angle of incidence, will land on the grating at position $$s_{new} = 2h_{new} \tan\alpha$$

At this position s one finds a pitch that was originally at $s_{new} - \Delta s$. Hence this pitch is $$D_{new}(s) = \frac{\lambda_{old}}{2}\sqrt{1 + \left(\frac{2h_{old}}{s_{new} - \Delta s}\right)^2}$$

But the pitch itself also has expanded. Hence the pitch is given by $$D_{new}(s) = \frac{\lambda_{old}}{2}\sqrt{1 + \left(\frac{2h_{old}}{s_{new} - \Delta s}\right)^2}(1 + \vartheta_{Si}\Delta T)$$

wherein $$\Delta S = s_{new}\vartheta_{Si}\cdot\Delta T$$

The new wavelength $\lambda_{new}$ that is Littrow—diffracted at this position is given by $$\lambda_{new} = 2D_{new}\cdot\sin\alpha = \lambda_{old}\sin\alpha\sqrt{1 + \left(\frac{2h_{old}}{s_{new}(1 - \vartheta_{Si}\Delta T)}\right)^2}(1 + \vartheta_{Si}\Delta T) =$$

$$\lambda_{old}\sin\alpha\sqrt{1 + \left(\frac{2h_{old}\cot\alpha}{2h_{new}(1 - \vartheta_{Si}\Delta T)}\right)^2}(1 + \vartheta_{Si}\Delta T)$$

When using a first order expansion $$\lambda_{new} = \lambda_{old}\sin\alpha\sqrt{1 + \left(\frac{2h_{old}\cot\alpha}{2h_{old}(1 + \vartheta_{SO}\Delta T)(1 - \vartheta_{Si}\Delta T)}\right)^2}(1 + \vartheta_{Si}\Delta T) =$$

$$\lambda_{old}\sin\alpha\sqrt{1 + \frac{\cot^2\alpha}{(1 + \vartheta_{so}\Delta T)^2(1 - \vartheta_{Si}\Delta T)^2}}(1 + \vartheta_{Si}\Delta T) \cong$$

$$\lambda_{old}\sin\alpha\sqrt{1 + \cot^2\alpha(1 - 2\vartheta_{so}\Delta T)(1 + 2\vartheta_{Si}\Delta T)}(1 + \vartheta_{Si}\Delta T) =$$

$$\lambda_{old}\sin\alpha\sqrt{1 + \cot^2\alpha - \cot^2\alpha(2\vartheta_{so} - 2\vartheta_{Si})\Delta T}(1 + \vartheta_{Si}\Delta T) =$$

-continued $$\lambda_{old}\sin\alpha\sqrt{1+\cot^2\alpha}\sqrt{1-\frac{\cot^2\alpha}{1+\cot^2\alpha}(2\vartheta_{so}-2\vartheta_{Si})\Delta T}\,(1+\vartheta_{Si}\Delta T)\cong$$

$$\lambda_{old}(1+\cos^2\alpha(\vartheta_{Si}-\vartheta_{so})\Delta T)(1+\vartheta_{Si}\Delta T)\cong$$

$$\lambda_{old}(1+[\vartheta_{Si}+\cos^2\alpha(\vartheta_{Si}-\vartheta_{so})]\Delta T)\Rightarrow\lambda_{new}=\lambda_{old}$$

if $\vartheta_{so}=\vartheta_{Si}\dfrac{1+\cos^2\alpha}{\cos^2\alpha}$

For the case α=45 deg this results in the condition $\vartheta_{so}=3\varepsilon_{Si}$, i.e. the condition that the stand-off should expand three times faster than silicon. The above condition may be modified to account for the presence of a thermo-optic effect due to the propagation medium extending along the path of light rays between the first optical element 14 and the second optical element 15. For such cases, a further first order correction term stemming from the refractive index change (e.g. $dn_a/dT$) for the propagation medium with temperature is changing the new chirped pitch by an amount $(1-\Delta T\,d(\ln n_a)/dT)$, which results in the following condition:

$$\vartheta_{SO}=\frac{\left(\dfrac{\vartheta_{Si}d\ln n_a}{dT}\right)}{\cos^2\alpha}+\vartheta_{Si}.$$

For the foregoing derivation, the coefficient of thermal expansion of silicon has been used for a silicon-based chip, e.g. for silicon-on-insulator (SOI) chip having a silicon waveguide layer 12 formed on or in a substrates 11, e.g. a substrate comprising a buried oxide layer. The skilled person will know, after a thoughtful consideration of residual tensile stresses and thickness values for the upper waveguide layer and for the substrate layer (or layers in a layer stack) immediate contacting the waveguide layer from below, which coefficient of thermal expansion is the relevant one. For instance, the skilled person will know that a sufficiently thick silicon waveguide layer will relax the thermally induced stresses caused by the substrate material, e.g. stress causing strain applied by the buried oxide layer, and the coefficient of thermal expansion for silicon is dominating the expansion effects in the waveguide layer. However, the thermal expansion of a thin silicon waveguide layer will be constraint by the substrate layer below and in direct contact therewith, similar to a bi-metal strip for thermometers, and will build up internal stress. In such case, the skilled person would recognize that the coefficient of thermal expansion for the substrate layer, e.g. the buried oxide, is the more relevant one and substitute it into the foregoing derivations.

Further by way of illustration, the sensitivity to errors on the height of the stand-off is also discussed. Assume that a design is made with a given $h=h_0$, a given $\lambda=\lambda_0$ and a given angle $\alpha=\alpha_0$ (being the central direction of the beam coming from the first optical element). Considering that $$\lambda=2\sin\alpha D(s)\text{ with}$$

$$s=2h\tan\alpha=\lambda_0\sin\alpha\sqrt{1+\left(\frac{2h_0}{2h\tan\alpha}\right)^2}=$$

$$\lambda_0\sin\alpha\sqrt{1+\left(\left(1-\frac{\Delta h}{h_0}\right)\cot\alpha\right)^2}\cong\lambda_0\sin\alpha\sqrt{1+\cot^2\alpha-\frac{2\Delta h}{h_0}\cot^2\alpha}=$$

-continued $$\lambda_0\sqrt{1-\frac{2\Delta h}{h_0}\frac{1}{1+\tan^2\alpha}}\cong\lambda_0\left(1-\frac{\Delta h}{h_0}\frac{1}{1+\tan^2\alpha}\right)=$$

$$\lambda_0\left(1-\frac{\Delta h}{h_0}\cos^2\alpha\right)\Rightarrow\lambda\cong\lambda_0\left(1-\frac{\Delta h}{h_0}\cos^2\alpha\right)$$

This equation describes the spectral shift due to small errors on the height h (expressed as $\Delta h$) for a given deflection angle α. This expression is in first order invariant for the deflection angle α for α=90 deg. Therefore in an advantageous embodiment a large deflection angle α is used.

In a second aspect, the present invention relates to an integrated system for providing a stable reference wavelength. The system comprises an integrated wavelength-selective filter device according to embodiments of the first aspect, an integrated broadband light source, and at least one light guide coupled to the light source and to the first optical element of the wavelength-selective filter device for providing broadband light to the first optical element and for extracting radiation having the reference wavelength from the first optical element. In some embodiments, the system furthermore comprises a plurality of integrated detector elements. The integrated wavelength-selective filter is then adapted for diffracting radiation of different wavelengths to different predetermined positions so as to direct radiation of different wavelengths to different integrated detector elements. The integrated system then may be an integrated spectrometer. In these embodiments, a single second optical element, oriented off-axis, is thus used for selecting different wavelengths for different spectral channels of the spectrometer. Further features and advantages may correspond with features and advantages as described for embodiments of the first aspect.

In a third aspect, the present invention relates to an integrated spectrometer system, the system comprising a plurality of integrated wavelength-selective filter devices according to embodiments of the present invention, a plurality of light guiding circuits, and a plurality of integrated detectors. Each of the plurality of wavelength-selective filter devices is configured to have a different reference wavelength thereby defining a set of reference wavelengths, and each of the plurality of light guiding circuits is adapted to receive a fraction of an externally applied radiation signal and to transmit it to one of the plurality of wavelength-selective filter devices for obtaining therefrom radiation of a specific reference wavelength and for directing the obtained radiation to one of the plurality of detectors. In these embodiments, the plurality of integrated wavelength-selective filter devices is thus used for each providing a specific wavelength for a specific spectral channel of the spectrometer. Further features and advantages may correspond with features and advantages of embodiments of the first aspect.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Figure 6:
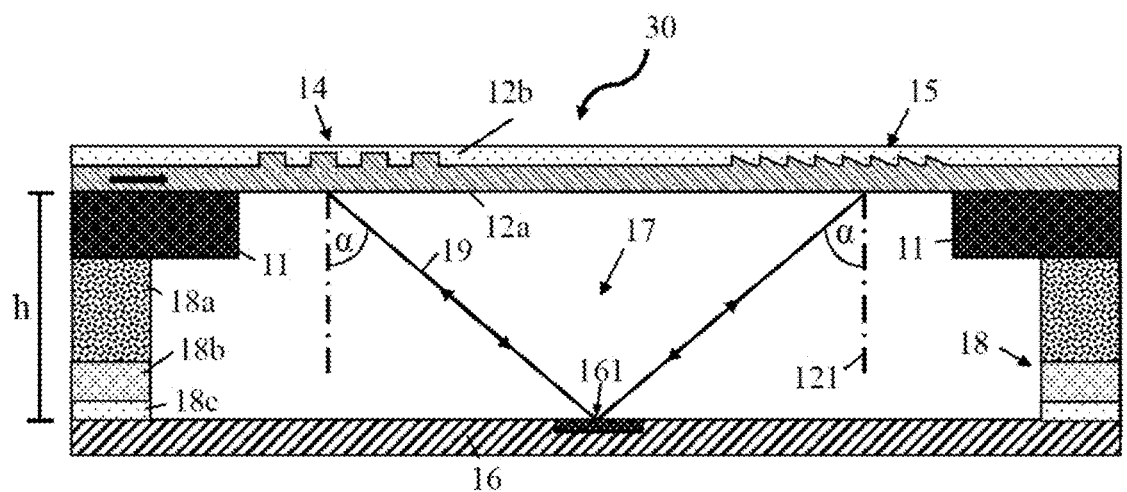
FIG. 6 is a schematic cross-sectional view of an integrated wavelength-selective filter device according to an alternative embodiment of the invention, comprising two integrated gratings as first and second optical elements arranged on a flat surface and one additional reflective surface positioned below the flat surface.

For instance, an alternative embodiment of the wavelength-selective filter device is described in reference to FIG. 6. A schematic cross-sectional view of an integrated wavelength-selective filter device 30 is shown. The integrated wavelength-selective filter device 30 comprises two integrated gratings as first and second optical elements 14, 15, which are arranged on a flat surface of the device, e.g. patterned into the same top surface of a substrate comprising substrate layers 11, 12a-b. A non-limiting example of the substrate layers 11, 12a-b may be a buried oxide layer 11 and a silicon waveguide layer 12a at least partially covered by an oxide cladding layer 12b. The integrated wavelength-selective filter device 30 also includes a reflective surface portion 161 which forms part of a second substrate 16 positioned below the flat surface on which the first and second optical elements 14, 15 are arranged. A stand-off 18, also included in the integrated wavelength-selective filter device 30, is provided as a pillar-like or wall-like material stack comprising, for this example, four different material layers 11, 18a, 18b and 18c. The stand-off partially confines a space 17, which is filled by a propagation medium, e.g. an air-filled space 17, such that directed received light is propagating from the first optical element 14, through the space 17 filled with the propagation medium, to the second optical element 15, and back after back-diffraction by the second optical element 15. In this particular embodiment the stand-off 18 is partially formed from a material layer 11 of the first substrate, e.g. by etching a trench or cavity or a complete channel opening through the substrate layer 11, e.g. by deep reactive ion etching. Hence, it is an advantage that the stand-off may be formed at the same time as the confined space for the propagation medium. The three stacked material layers 18a, 18b and 18c are optional and may be provided for attachment of the second substrate 16 and/or for the accurate height (h) control of the stand-off 18. Additionally, the thickness and material composition of each of the three stacked material layers 18a, 18b and 18c may be selected separately. This has the advantage that the relationship between coefficients of thermal expansion for the stand-off material and the substrate material 12, into which the first and second optical elements 14, 15 are patterned, can be obtained as an average over all the material layers included in the stand-off 18. For instance, a coefficient of thermal expansion for the stand-off material being approximately three times as large as the coefficient of thermal expansion for silicon as substrate material 12 may be difficult to obtain or to control in a very precise way. In such a situation, providing a material layer stack as the stand-off material can mitigate the problem, because the composition and thermal expansion properties of each individual material layer 18a, 18b and 18c included in the stand-off 18 may be engineered separately.

The efficiency of a grating coupler as first optical element 14 may be further improved by locally depositing a thin reflective metal (e.g. gold) layer on top of the grating structure of the first optical element.

In a variant of this embodiment the three additional material layers 18a-c within the stand-off 18 may be absent. In consequence, the second substrate 16 comprising the reflective surface portion 161 may be directly attached to the bottom surface of the substrate (material) layer 11. If an accurate positioning of the reflective surface portion 161 is sought with respect to the flat surface on which the first and second optical element 14, 15 are arranged, such a variant may be particularly advantageous, because the backside of the first substrate is typically very smooth and flat, e.g. the substrate backside of a wafer-processed photonic chip. Therefore, only very little tilt errors may be expected for the reflective surface portion 161.

Figure 7:
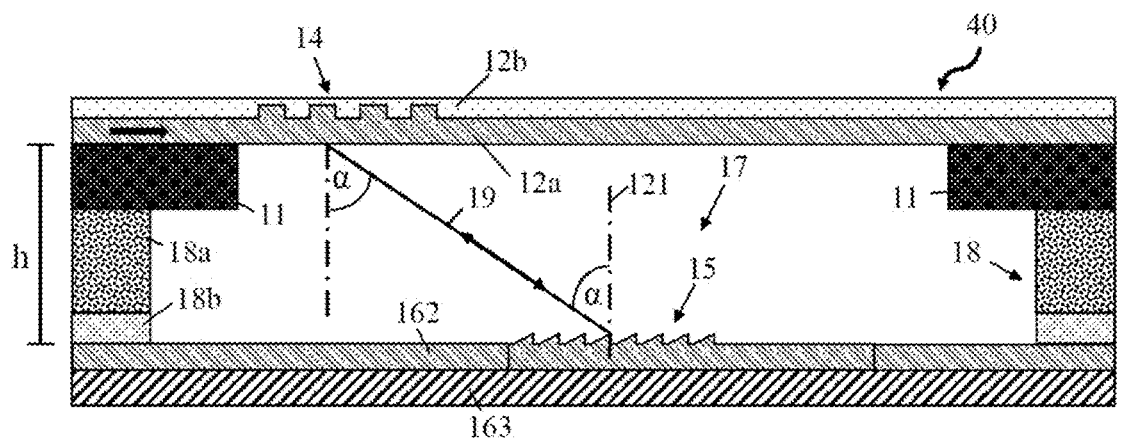
FIG. 7 is a schematic cross-sectional view of an integrated wavelength-selective filter device according to an alternative embodiment of the invention, comprising two integrated gratings as first and second optical elements respectively arranged on an upper first flat surface and a lower second flat surface, and without any additional reflective surfaces.

Yet an alternative embodiment of the wavelength-selective filter device is described in reference to FIG. 7. A schematic cross-sectional view of an integrated wavelength-selective filter device 40 is shown. The integrated wavelength-selective filter device 40 comprises two integrated gratings as first and second optical elements 14, 15, which are arranged on two distinct, but parallel flat surfaces of the device, e.g. patterned into the top surfaces of a first and a second substrate, wherein the first substrate may comprise substrate layers 11, 12a-b and the second substrate may comprise substrate layers 162, 163. A non-limiting example of the substrate layers 11, 12a-b may be a buried oxide layer 11 and a silicon waveguide layer 12a at least partially covered by an oxide cladding layer 12b. Likewise, the substrate layers 162, 163 may respectively comprise silicon and a buried oxide. A first opening may be etched into or through the first substrate to provide a partially confined space 17 comprising a propagation medium, e.g. air, as well as at least a portion of a stand-off 18. For example, the remaining substrate material of substrate layer 11 may provide a portion or the full stand-off 18. Optionally, the stand-off 18 may also include further material layers 18a, 18b, which may be of advantage for adjusting the height h of the stand-off 18 and/or for engineering the average/combined coefficient of thermal expansion $\vartheta_{SO}$ of the stand-off 18. The second substrate comprising the second optical element 15 may be attached directly to the backside of the first substrate (e.g. to the bottom surface of the substrate layer 11) or to a surface of one of the additional material layers 18a, 18b, which are optionally included in the stand-off 18. No additional reflective surface is needed in this embodiment.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An integrated wavelength-selective filter device comprising:
    a first optical element patterned in or on a substrate, the first optical element being configured for receiving radiation incident thereon and for directing at least partially said received radiation into a direction defined by a first angle,
    a second optical element patterned in or on a substrate, the second optical element being a diffractive element and extending longitudinally and arranged distantly to the first optical element, the second optical element being configured for receiving said directed radiation under an angle of incidence and adapted for diffracting said directed radiation under a second angle, said second angle depending on wavelength,
    wherein the first optical element directs said received radiation into a propagation medium, said directed radiation propagating solely through the propagation medium until being received at the second optical element, the propagation medium being formed from a material being different from any material of said substrate of said first and said second optical element, and
    wherein the second optical element is configured such that the second angle is such that, for a single reference wavelength, the diffracted radiation is directed into said propagation medium for advancing in said propagation medium towards a predetermined position on the first optical element or on a further optical element for filtering radiation having a wavelength substantially matching the reference wavelength from radiation having a substantially different wavelength, wherein the reference wavelength is uniquely determined for the entire device.

2. The integrated wavelength-selective filter device according to claim 1, wherein said propagation medium is formed from a material with substantially smaller thermo-optic refractive index coefficient as compared to the respective thermo-optic refractive index coefficient of any material of said substrate of said first and said second optical element.

3. The integrated wavelength-selective filter device according to claim 1, wherein the second optical element is adapted for back-reflecting into said propagation medium said directed radiation for advancing in said propagation medium along the same elevation angular direction but with opposite propagation sense as compared to the radiation incident on the second optical element, said elevation angular direction being defined with respect to a flat surface of the substrate of the second optical element.

4. The integrated wavelength-selective filter device according to claim 1, wherein the second optical element is configured in an off-axis configuration so as to diffract backwards the radiation incident on the second optical element along a different azimuthal angular direction as compared to the azimuthal angular direction of the incident radiation incident on the second optical element, an azimuthal angular direction being defined with respect to a flat surface of the substrate of the second optical element, the filter device further comprising a further optical element having similar characteristics as the first optical element and being configured for coupling out the filtered radiation.

5. The integrated wavelength-selective filter device according to claim 3, wherein the second optical element is configured in an off-axis configuration so as to diffract backwards the radiation incident on the second optical element along a different azimuthal angular direction as compared to the azimuthal angular direction of the incident radiation incident on the second optical element, an azimuthal angular direction being defined with respect to a flat surface of the substrate of the second optical element, the filter device further comprising a further optical element having similar characteristics as the first optical element and being configured for coupling out the filtered radiation.

6. The integrated wavelength-selective filter device according to claim 1, wherein the filter device comprises at least one material with a thermal expansion coefficient or design, such that, for a change in at least the second angle caused by a change in the temperature of the device, the length of a path of said directed radiation propagating in said propagation medium from the first optical element to the second optical element is adapted automatically by thermal expansion of the device due to the temperature change, such that for the reference wavelength, the diffracted radiation again is directed to the predetermined position.

7. The integrated wavelength selective filter device according to claim 1, wherein the first optical element and the second optical element are patterned in or on the same substrate or wherein the first optical element and the second optical element are formed in a semiconductor or dielectric substrate of a chip.

8. The integrated wavelength-selective filter device according to claim 1, wherein the filter device comprises a reflective element so that on the path of said directed radiation propagating in said propagation medium from the first optical element to the second optical element, the radiation is reflected by a reflective surface of the reflective element.

9. The integrated wavelength-selective filter device according to claim 8,
wherein the first optical element and the second optical element are both formed on a same flat surface of the device, and
wherein the reflective element is positioned above or below said flat surface.

10. The integrated wavelength-selective filter device according to claim 9, wherein the device furthermore comprises at least one stand-off for supporting the reflective element being positioned above or below said flat surface.

11. The integrated wavelength-selective filter device according to claim 10,
wherein the filter device comprises at least one material with a thermal expansion coefficient or design, such that, for a change in at least the second angle caused by a change in the temperature of the device, the length of a path of said directed radiation propagating in said propagation medium from the first optical element to the second optical element is adapted automatically by thermal expansion of the device due to the temperature change, such that for the reference wavelength, the diffracted radiation again is directed to the predetermined position, and
wherein the adapting of a path length is obtained by thermal expansion of the at least one stand-off.

12. The integrated wavelength-selective filter device according to claim 11,
wherein both the first optical element and the second optical element are patterned in or on the same substrate material, and
wherein the stand-off comprises at least one material selected in such a way that its overall thermal expansion coefficient is approximately three times larger than the thermal expansion coefficient of the substrate material of the first and second optical element.

13. The integrated wavelength-selective filter device according to claim 10, wherein the at least one stand-off is at least partially formed from a material of the substrate of the first and second optical element by locally removing a portion of said material of the substrate.

14. The integrated wavelength-selective filter device according to claim 12, wherein temperature insensitivity is less than 1 pm/K over a temperature range of 100 K.

15. The integrated wavelength-selective filter device according to claim 1, wherein the first optical element and the second optical element are positioned above one another and wherein the propagation path for the diffracted radiation through said propagation medium is following a straight line.

16. The integrated wavelength-selective filter device according to claim 15, wherein the filter device comprises at least one material with a thermal expansion coefficient or design, such that, for a change in at least the second angle caused by a change in the temperature of the device, the length of a path of said directed radiation propagating in said propagation medium from the first optical element to the second optical element is adapted automatically by thermal expansion of the device due to the temperature change, such that for the reference wavelength, the diffracted radiation again is directed to the predetermined position.

17. The integrated wavelength-selective filter device according to previous claim 1, wherein the first optical element or the further optical element is connected to a waveguide for transporting the optical input and output signals into and out of the filter device.

18. The integrated system for providing a stable reference wavelength, the system comprising:
    an integrated wavelength-selective filter device according to claim 1,
    an integrated broadband light source, and
    at least one light guide coupled to the light source and to the first optical element of the wavelength-selective filter device for providing broadband light to the first optical element.

19. The integrated system according to claim 18, wherein the system furthermore comprises a plurality of integrated detector elements and wherein the integrated wavelength-selective filter is adapted for diffracting radiation of different wavelengths to different predetermined positions so as to direct radiation of different wavelengths to different integrated detector elements.

20. An integrated spectrometer system, the system comprising a plurality of integrated wavelength-selective filter devices according to claim 1, a plurality of light-guiding circuits, and a plurality of integrated detectors, wherein each of the plurality of wavelength-selective filter devices is configured to have a different reference wavelength, thereby defining a set of reference wavelengths, and wherein each of the plurality of light-guiding circuits is configured to receive a fraction of an externally applied radiation signal and to transmit said received fraction of the applied radiation signal to one of the plurality of wavelength-selective filter devices for obtaining therefrom radiation of a specific reference wavelength and for directing the obtained radiation to one of the plurality of detectors.

* * * * *